US012755365B2

(12) United States Patent
Park

(10) Patent No.: US 12,755,365 B2
(45) Date of Patent: Oct. 6, 2026

(54) VISION INSPECTION APPARATUS AND VISION INSPECTION METHOD

(71) Applicant: Eun Hong Park, Anyang-si (KR)

(72) Inventor: Eun Hong Park, Anyang-si (KR)

(73) Assignee: Eun Hong Park (KR)

( * ) Notice: Subject to any disclaimer, the term of this patent is extended or adjusted under 35 U.S.C. 154(b) by 0 days.

(21) Appl. No.: 19/257,299

(22) Filed: Jul. 1, 2025

(65) Prior Publication Data

US 2026/0030736 A1 Jan. 29, 2026

(30) Foreign Application Priority Data

Jul. 23, 2024 (KR) ........................ 10-2024-0097170

(51) Int. Cl.
*G06T 7/00* (2017.01)
*G01N 21/88* (2006.01)
(Continued)

(52) U.S. Cl.
CPC ....... *G06T 7/0004* (2013.01); *G01N 21/8806* (2013.01); *G01N 21/8851* (2013.01); *H04N 23/695* (2023.01); *H04N 23/71* (2023.01); *H04N 23/74* (2023.01); *G01N 2021/8887* (2013.01); *G01N 2201/103* (2013.01);
(Continued)

(58) Field of Classification Search
CPC ......... G06T 7/0004; G06T 2207/10152; G06T 2207/20221; G06T 2207/10016; G06T 2207/30164; G06T 7/001; G06T 7/70; G01N 21/8806; G01N 21/8851; G01N 2021/8887; G01N 2201/103; G01N 2021/8838; G01N 2201/104; H04N 23/695; H04N 23/71; H04N 23/74; G01D 5/245;
(Continued)

(56) References Cited

U.S. PATENT DOCUMENTS 8,315,838 B2 * 11/2012 Durrant-Whyte ...... G06Q 10/06 703/1
8,379,081 B2 * 2/2013 Aikawa ................ G01S 3/7864 348/92
(Continued)

FOREIGN PATENT DOCUMENTS

| | | |
|---|---|---|
| CN | 117907337 A | 4/2024 |
| KR | 102071989 B1 | 1/2020 |

(Continued)

*Primary Examiner* — Helen Shibru
(74) *Attorney, Agent, or Firm* — Renaissance IP Law Group LLP

(57) ABSTRACT

The present disclosure relates to a vision inspection apparatus and a vision inspection method for inspecting defects in a moving inspection target. The vision inspection apparatus includes an imaging device configured to capture at least a part of an inspection target, a motor configured to move at least one of the imaging device and the inspection target so that a relative location of the imaging device and the inspection target change, an encoder unit configured to detect driving of the motor, an encoder signal processing unit configured to analyze an encoder signal transmitted from the encoder unit to generate encoder data, and an image fusion unit configured to fuse the encoder data to image data acquired by the imaging device to generate fused image data.

20 Claims, 4 Drawing Sheets

(51) Int. Cl.
*H04N 23/695* (2023.01)
*H04N 23/71* (2023.01)
*H04N 23/74* (2023.01)

(52) U.S. Cl.
CPC ............... *G06T 2207/10152* (2013.01); *G06T 2207/20221* (2013.01)

(58) Field of Classification Search
CPC . G06V 10/141; G06V 10/803; G06V 2201/06
USPC ............................................................ 348/92
See application file for complete search history.

(56) References Cited

U.S. PATENT DOCUMENTS

| | | | | |
|---|---|---|---|---|
| 8,953,870 | B2 * | 2/2015 | Oikawa | G01N 21/954<br>356/426 |
| 10,068,322 | B2 * | 9/2018 | O'Connor | G06T 7/0004 |
| 11,722,790 | B2 * | 8/2023 | Edwards | G01N 21/88<br>348/92 |
| 2012/0327215 | A1 * | 12/2012 | Case | G01N 21/8903<br>235/375 |
| 2018/0350060 | A1 * | 12/2018 | Nakao | G06T 7/194 |
| 2021/0056679 | A1 * | 2/2021 | Nakashige | G06T 7/0004 |
| 2021/0195086 | A1 * | 6/2021 | Baba | G06T 5/50 |
| 2025/0229416 | A1 * | 7/2025 | Ferguson | B25J 9/1607 |

FOREIGN PATENT DOCUMENTS

| | | | |
|---|---|---|---|
| KR | 102357695 | B1 | 2/2022 |
| KR | 20230063961 | A | 5/2023 |
| KR | 102542068 | B1 | 6/2023 |

* cited by examiner

VISION INSPECTION APPARATUS AND VISION INSPECTION METHOD

CROSS-REFERENCE TO RELATED APPLICATION

This application claims priority to Korean Patent Application No. 10-2024-0097170 filed on Jul. 23, 2024 and all the benefits accruing therefrom under 35 U.S.C. § 119, the contents of which are incorporated by reference in their entirety.

BACKGROUND

The present disclosure relates to a vision inspection apparatus and a vision inspection method, and more specifically, to a vision inspection apparatus and a vision inspection method for inspecting defects in a moving inspection target.

In the production line of various products, an optical inspection process is applied in which an image of an inspection target is captured using a camera to acquire the image of the inspection target and then analyze the image.

For example, a method may be applied in which a camera captures an image of an inspection target when the inspection target is located within a camera's image capturing range in a process of placing the inspection target on a stage that is moved using a motor and transporting the inspection target. In addition, when a product in the form of a film wound in a roll shape is the inspection target, a method may be applied in which the camera captures an image of a desired location on the inspection target when the inspection target moves through the rotation of a roll.

Conventionally, in such an optical inspection process, a trigger signal was used to operate the camera so that the camera could accurately capture an image of a desired part of the inspection target by considering the camera's image capturing range.

The conventional method of using the trigger signal mainly adopts a method of applying an encoder that detects the rotation of a motor used to transport an inspection target to count the number of pulses in a pulse train output by the encoder and generating the trigger signal at an appropriate point in time.

In particular, the conventional trigger signal generation technique operates in such a way that a device for generating a trigger signal is provided separately from an encoder counter that counts an encoder signal to generate an encoder count value, and an inspection computer receives a signal from the encoder counter, transmits the signal to a trigger signal generation device, and generates a trigger signal to acquire an image without without any interlocking operations between the device and the inspection computer.

According to such a conventional trigger signal generation technique, a time delay occurs in a process in which the inspection computer recognizes a signal such as an encoder count value by an operating system (OS) installed inside the inspection computer, generates a trigger signal, and starts an operation of acquiring an image of an inspection target, which results in a problem of acquiring an inaccurate image that deviates from a location required for optical inspection.

For example, if a specific encoder count value is input to the inspection computer while the signal generated by the encoder counter is continuously and consistently input to the inspection computer, the operating system (OS) of the inspection computer recognizes the input of the encoder count value and image acquisition starts. In this case, there occurs a time delay caused by the operating system (OS) of the inspection computer between a point in time when the encoder counter signal is input and a point in time when image acquisition starts. That is, a primary delay occurs until the operating system (OS) of the inspection computer recognizes the encoder counter signal, and a secondary delay occurs until the OS of the inspection computer starts image acquisition by the trigger signal. As a result, a desired target image is not obtained, and an image offset by the delay time caused by the OS of the inspection computer is acquired.

Therefore, an optical inspection capable of obtaining a desired target image by the camera and effectively detecting a defect location of the inspection target is required.

PRIOR ART DOCUMENT

Patent Document

Korean Patent No. 10-2071989

SUMMARY

The present disclosure provides a vision inspection apparatus and a vision inspection method capable of effectively detecting a defect location of a moving inspection target.

In accordance with an exemplary embodiment, a vision inspection apparatus includes an imaging device configured to capture at least a part of an inspection target, a motor configured to move at least one of the imaging device and the inspection target so that a relative location of the imaging device and the inspection target change, an encoder unit configured to detect driving of the motor, an encoder signal processing unit configured to analyze an encoder signal transmitted from the encoder unit to generate encoder data, and an image fusion unit configured to fuse the encoder data to image data acquired by the imaging device to generate fused image data.

The imaging device may be configured to capture an image of the inspection target moving relative to the imaging device, and the image fusion unit may be configured to fuse the encoder data of a time when the imaging device captured the image to the image data.

The vision inspection apparatus may further include an image data generation unit configured to generate the image data using an image signal generated according to image capturing of the imaging device and the image signal may include a synchronization signal.

The image data generation unit may be configured to generate a plurality of the image data according to the synchronization signal, and the image fusion unit may be configured to respectively merge each of the encoder data to a front end or rear end of each of the image data.

The vision inspection apparatus may further include an output image signal generation unit configured to generate an output image signal using the fused image data, and the output image signal may include an output synchronization signal.

The synchronization signal and the output synchronization signal may be different from each other.

The vision inspection apparatus may further include a lighting unit configured to change lighting brightness according to the synchronization signal.

The synchronization signal may include a pulse signal, and the lighting unit may change the lighting brightness in a second pulse differently from the lighting brightness in a first pulse.

The image fusion unit may further fuse brightness value data according to the lighting brightness to generate the fused image data.

The fused image data may be grouped according to a brightness value of the brightness value data.

The encoder signal processing unit may include an encoder signal analysis unit configured to analyze a driving direction of the motor based on the encoder signal and an encoder count unit configured to count the encoder signal according to the driving direction of the motor to calculate an encoder count value.

The encoder data may include the encoder count value, and the imaging device may be provided in plurality, to respectively capture at least partially the inspection target.

Each of the imaging devices may be configured to respectively capture an image of at least partially different part, and the image fusion unit may be configured to respectively fuse each of the encoder data to each of the image data acquired by each of the imaging devices to generate a plurality of the fused image data. Each of the fused image data, of which the encoder count values are the same may be synchronized with each other.

The motor may move the inspection target in a first direction, and the imaging device may perform scanning in a second direction intersecting with the first direction.

The vision inspection apparatus may further include an auxiliary motor that moves the imaging device in the second direction, the encoder unit may be further configured to detect driving of the auxiliary motor, and the image fusion unit may be configured to fuse encoder data of the motor and encoder data of the auxiliary motor to the image data to generate the fused image data.

The vision inspection apparatus may further include a temperature sensor configured to measure a temperature of the lighting unit, and the image fusion unit may be configured to further fuse temperature value data measured by the temperature sensor to generate the fused image data.

In accordance with another exemplary embodiment, a vision inspection method includes a process of moving an inspection target relative to an imaging device by a motor, a process of generating image data by capturing an image of at least a part of the inspection target that relatively moves by the motor using the imaging device, a process of detecting driving of the motor by an encoder unit, a process of generating encoder data by analyzing an encoder signal transmitted from the encoder unit, and a process of generating fused image data by fusing the encoder data of a time when the imaging device captured the image to the image data.

The process of generating the image data may include a process of generating a plurality of the image data according to a synchronization signal included in an image signal by using the image signal generated according to image capturing of the imaging device, and the process of generating the fused image data may include a process of merging each of the encoder data to a front end or rear end of each of the image data, respectively.

The synchronization signal may include a pulse signal, the process of generating the plurality of the image data may further include a process of capturing an image of at least a part of the inspection target with a first lighting brightness in a first pulse and a process of capturing an image of at least a part of the inspection target with a second lighting brightness different from the first lighting brightness in a second pulse, and, in the process of generating the fused image data, brightness value data according to lighting brightness may be further fused to generate the fused image data.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
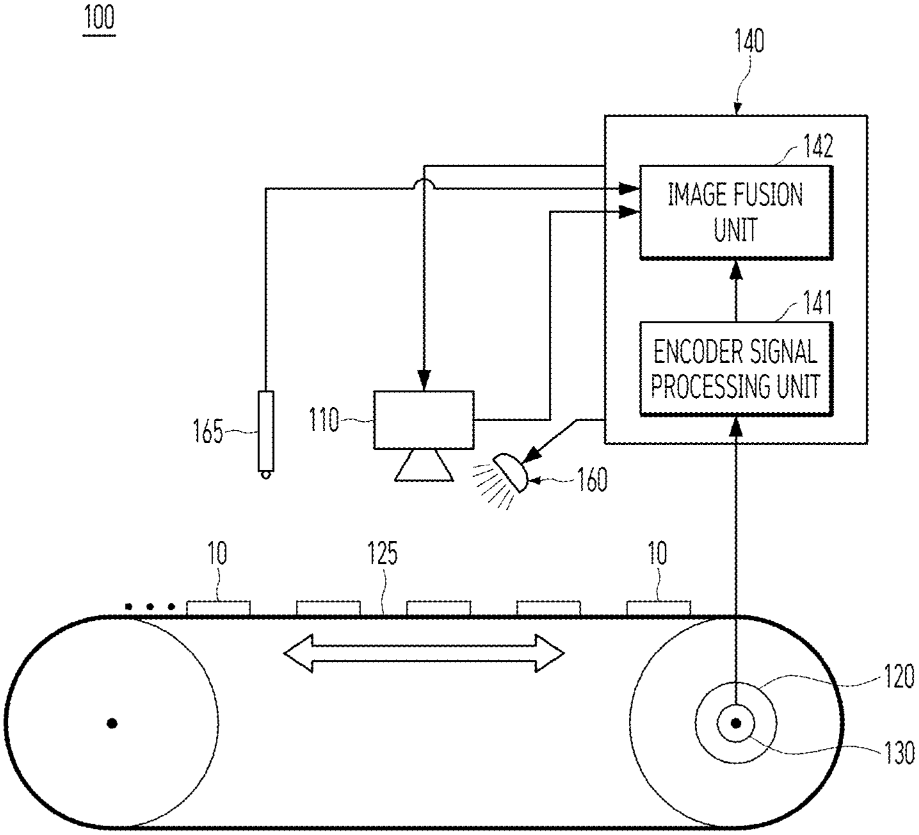
FIG. 1 is a schematic cross-sectional view showing a vision inspection apparatus according to an embodiment of the present disclosure.

Hereinafter, embodiments of the present disclosure will be described in more detail with reference to the accompanying drawings. However, the present disclosure is not limited to the embodiments disclosed below, but may be implemented in various different forms, and these embodiments are provided only to ensure that the disclosure of the present disclosure is complete, and to fully inform those skilled in the art of the scope of the inventive concept. In the description, the same reference numerals are assigned to the same components, and the drawings may be partially exaggerated in size in order to accurately describe the embodiments of the present disclosure, and the same reference numerals in the drawings indicate the same elements.

FIG. 1 is a schematic cross-sectional view showing a vision inspection apparatus according to an embodiment of the present disclosure.

Referring to FIG. 1, a vision inspection apparatus 100 according to an embodiment of the present disclosure includes an imaging device 110 that captures an image of at least a part of an inspection target 10, a motor 120 that moves at least one of the imaging device 110 and the inspection target 10 so that relative locations of the imaging device 110 and the inspection target 10 change, an encoder unit 130 that detects driving of the motor 120, an encoder signal processing unit 141 that analyzes an encoder signal transmitted from the encoder unit 130 to generate encoder data 41, and an image fusion unit 142 that fuses the encoder data 41 to image data 15 acquired by the imaging device 110 to generate fused image data 42.

The imaging device 110 may capture an image of the inspection target 10 that is a subject of vision inspection (or optical inspection), may include an image sensor, etc., and may measure an amount of light per pixel incident on the image sensor to generate an electrical image signal (or Video Signal). In this case, the imaging device 110 may capture an image of at least a part of the inspection target 10, and may capture an image of the entire inspection target 10 or may capture an image of only a part of the inspection target 10. For example, the image sensor may convert light to accumulate electric charge in each pixel of the image sensor, and may generate the image signal through the quantity of electric charge accumulated in this manner. Then, the imaging device 110 may transmit the generated image signal to an image data generation unit 115, and the image data generation unit 115 may generate the image data 15 with (from) the transmitted image signal. In this case, the image sensor may include a complementary metal-oxide-semiconductor (CMOS) image sensor.

Here, the imaging device 110 may mean a (simple) camera or may mean a part of a camera (system). The imaging device 110 may be a linear imaging device or an area imaging device, and when the imaging device 110 is a camera, it may include a line scan camera and an area camera, and may be one or more cameras. The line scan camera may include a contact image sensor (CIS) camera and may be driven by a principle similar to that of a scanner. In this case, the line scan camera may have a one-dimensional array of devices (or pixels of the image sensor) that capture images, and may capture and output images by an external trigger or an internal auto trigger.

The area camera is a commonly used camera, has a two-dimensional array of devices (or pixels) that capture images, and is also called an area scan camera. The commonly mentioned 1920x1080 (Full HD) pixels refer to the number of two-dimensionally arranged image capturing devices. For example, an image signal of the area camera may be composed of two image control signals (e.g., synchronization signals) and one data set on the time axis, and the image data 15 may include an image section (e.g., actual captured image data) and/or a non-image section (e.g., non-image data of a unique rest time of the image sensor).

The motor 120 may move at least one of the imaging device 110 and the inspection target 10 so that the relative locations of the imaging device 110 and the inspection target 10 change, and may move the inspection target 10 relative to the imaging device 110 and adjust the relative locations of the imaging device 110 and the inspection target 10. Through this, the imaging device 110 may capture images of different locations of the inspection target 10 and/or different inspection targets 10 (over time). In this case, the motor 120 may move the inspection target 10, may move the imaging device 110, or may move both the inspection target 10 and the imaging device 110, but it is sufficient if the imaging device 110 may capture the image of the inspection target 10 that moves relative to (or is moving relative to) the imaging device 110.

For example, the inspection target 10 may be supported (or placed) on a stage 125 such as a conveyor (belt), and the inspection target 10 may move (in a first direction) while the stage 125 moves (or moves) by the driving force of the motor 120. Here, a vision inspection may be performed on a plurality of inspection targets 10 moving along the stage 125 while the plurality of inspection targets 10 are placed on the stage 125 moving by the rotational force (or driving force) of the motor 100, and a vision inspection may be performed by photographing a part and/or the entire inspection target 10 for each section while winding a long film-shaped inspection target 10 in the form of a film having a long length onto a roll. In this time, the motor 120 may rotate the roll on which the inspection target 10 is wound, or the inspection target 10 may move while being wound by the driving (or rotation) of the motor 120.

The encoder unit 130 may detect the driving (e.g., rotation) of the motor 120, may include an encoder, and may output (or generate) an encoder signal according to the driving of the motor 120. For example, the encoder unit 130 may be provided on a rotation shaft of the motor 120, may detect the rotation of the motor 120, and may generate the encoder signal indicating (or for recognizing) a location of the inspection target 10 (i.e., a location on the stage). In this case, the encoder signal may be in the form of a pulse train, and the encoder unit 130 may be provided on the motor 120 that rotates the roll on which the inspection target 10 is wound when the inspection target 10 is wound on a roll, and the driving of the motor 120 may be detected by the encoder.

Here, the encoder unit 130 may include various types of encoders such as a servo motor encoder (or a rotary encoder), a linear encoder, and an incremental encoder, and may also output two types of channel signals (e.g., channel A and channel B). In this case, in the case of the linear encoder, etc., instead of the rotation of the motor 120, the motion of the motor 120, such as the direction of movement of advance (or forward direction) and retreat (or reverse direction) may be detected.

The encoder signal processing unit 141 may analyze the encoder signal transmitted from the encoder unit 130 to generate encoder data 41, separate a directionality of the encoder signal, and count the encoder signal according to the directionality of the encoder signal. For example, the encoder signal processing unit 141 may have a terminal or connector to which a wire that is connected to the encoder unit 130 and transmits the encoder signal may be connected, and the encoder signal may be input (or transmitted) thereto through the terminal or connector. Here, the encoder signal processing unit 141 may identify (or know) the location of the inspection target 10 through the encoder signal, and may generate the encoder data 41 with which the location of the inspection target 10 may be checked (or found).

The image fusion unit 142 may generate fused image data 42 by fusing (or converging) the encoder data 41 to the image data 15 acquired by the imaging device 110, and may insert and/or merge the encoder data 41 into a specific location (or part) of the image data 15, and may also change (or replace) a specific location of the image data 15 with the encoder data 41. Accordingly, the location of the inspection target 10 may be checked (or identified) through the encoder data 41 inherent (or included) in the fused image data 42, and a defect location of the inspection target 10 may be effectively found when a defect is found (or detected) in the image output (or generated) as the fused image data 42. Here, the image data 15 may be generated (or converted) through an image signal transmitted from the imaging device 110.

In this case, the imaging device 110 may capture an image of the inspection target 10 moving relative to the imaging device 110, and the image fusion unit 142 may fuse the encoder data 41 of a time when the imaging device 110 captured the image to the image data 15. For example, the defect of the inspection target 10 may be inspected while the imaging device 110 captures an image of the inspection target 10 moving, and the encoder data 41 during image capturing of the imaging device 110 (or of a time when the imaging device captured the image of the inspection target) for generating the image data 15 (i.e., the encoder data corresponding to the image data) may be fused to the image data 15. Accordingly, instead of capturing an image of a fixed (or stationary) inspection target 10 while changing only the location of the imaging device 110, the image of the moving inspection target 10 may be captured, thereby effectively performing a vision inspection on the moving inspection target 10, effectively inspecting (or detecting) defects on the moving inspection target 10, and effectively finding a defect location of the inspection target 10.

Therefore, the vision inspection device 100 according to the present disclosure may capture an image of (or photographs) the inspection target 10 moving relative to the imaging device 110 by the motor 120 with the imaging device 110 to generate the image data 15, and fuse the encoder data 41 to the generated image data 15 during image capturing, thereby effectively detecting a defect location of the inspection target 10 according to the encoder data 41 included (or inherent) in the fused image data 42. That is, the image capturing location of the imaging device 110 for the inspection target 10 (or the location of the inspection target) may be determined according to the driving (e.g., rotation) of the motor 120, and the location of the inspection target 10 of which image is captured by the imaging device 110 may be known by detecting the driving of the motor 120 by the encoder unit 130. In addition, by fusing the encoder data 41 according to the driving of the motor 120 during image capturing of the inspection target 10 to the image data 15 through the capturing of the imaging device 110 while capturing the image of the inspection target 10 with the imaging device 110, the defect location of the inspection target 10 may be accurately found according to the encoder data 41 of the fused image data 42 in which the defect is found (or detected).

Figure 2:
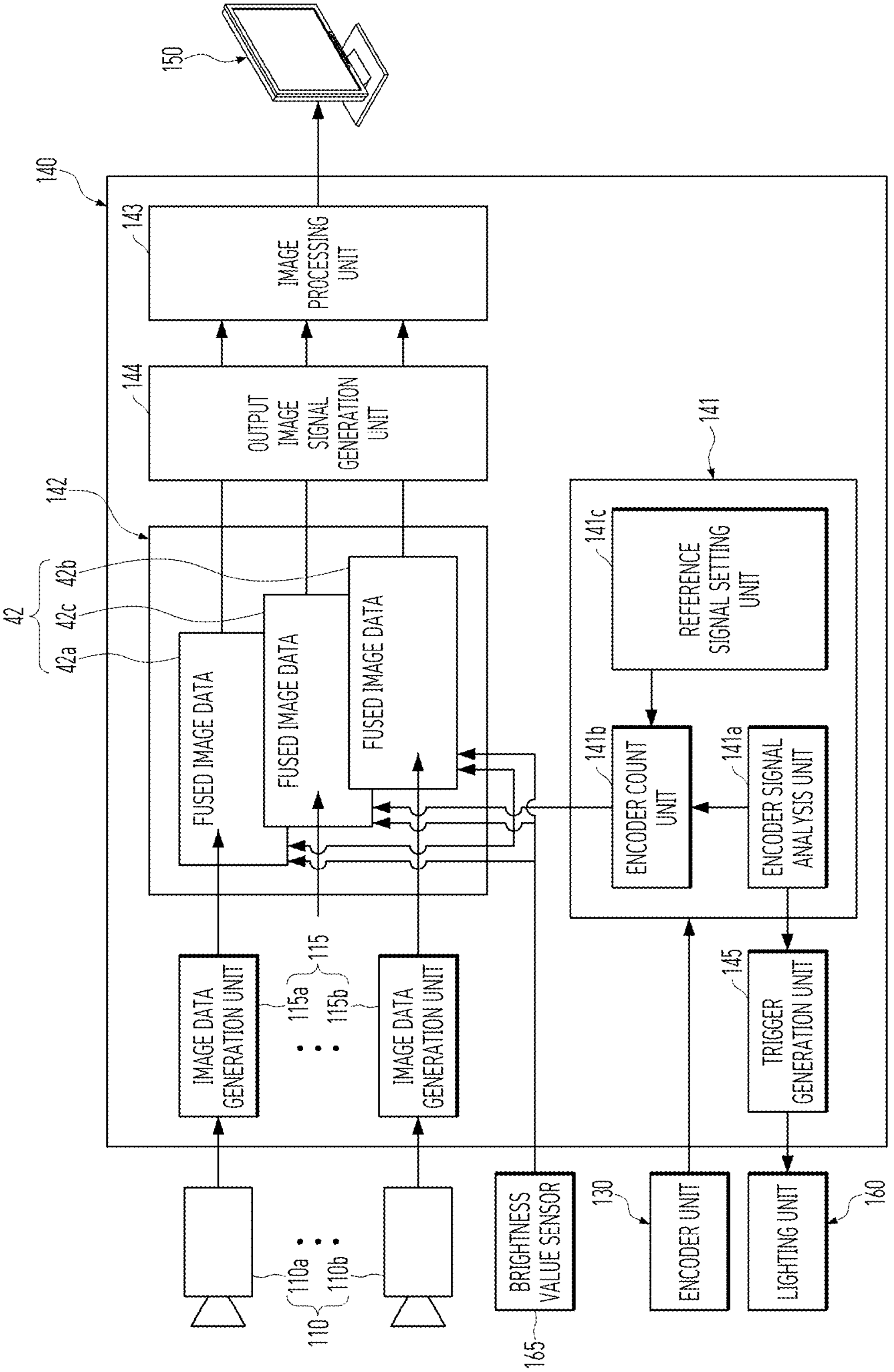
FIG. 2 is a block diagram for describing image fusion of a vision inspection apparatus according to an embodiment of the present disclosure.

FIG. 2 is a block diagram for describing image fusion of a vision inspection apparatus according to an embodiment of the present disclosure.

Referring to FIG. 2, the encoder signal processing unit 141 may include an encoder signal analysis unit 141*a* that analyzes a driving direction of the motor 120 based on the encoder signal and an encoder count unit 141*b* that counts the encoder signal according to the driving direction of the motor 120 to calculate an encoder count value. The encoder signal analysis unit 141*a* may analyze the driving direction (e.g., the rotation direction) of the motor 120 based on the encoder signal, and may analyze the driving direction of the motor 120 by analyzing the encoder signal transmitted (or input) from the encoder unit 130, and the analyzed driving direction of the motor 120 may be used to calculate the encoder count value by the encoder count unit 141*b*. For example, the encoder signal analysis unit 141*a* may analyze the rotation direction of the motor 120 based on two channels of encoder signals transmitted from the encoder unit 130. Generally, the encoder signal may be generated in the form of a two-channel pulse train generated using two code tracks having a phase difference of approximately 90 degrees. In this case, if a rotation axis of the motor 120 rotates clockwise (CW), an encoder signal of channel A may be set to have a phase that is approximately 90 degrees ahead of an encoder signal of channel B, and conversely, if the rotation axis of the motor 120 rotates counterclockwise (CCW), an encoder signal of channel B may be set to have a phase that is approximately 90 degrees ahead of the encoder signal of channel A. Here, the encoder signal analysis unit 141*a* may analyze the rotation direction of the motor 120 by checking a phase difference between the encoder signals of the two channels having such a phase difference.

The encoder count unit 141*b* may count the encoder signal according to the driving direction of the motor 120 to calculate the encoder count value, may count the encoder signal based on the driving direction of the motor 120 analyzed by the encoder signal analysis unit 141*a*, and the encoder count value may be obtained (or determined) according to the count of the encoder signal. For example, the encoder count unit 141*b* may count the encoder signal when the rotation of the motor 120 is either clockwise (CW) or counterclockwise (CCW) according to a preset (counting method). That is, the encoder count unit 141*b* may count the encoder signal only when it is analyzed that rotation occurs in a preset direction (e.g., clockwise), and may not count the encoder signal when it is analyzed that rotation occurs in a direction opposite to the preset direction (e.g., counterclockwise).

Meanwhile, if it is analyzed that rotation in the preset direction occurs, the encoder count unit 141*b* may count the encoder signal, and if it is analyzed that rotation in the opposite direction to the preset direction occurs, the encoder count unit 141*b* may stop counting the encoder signal and then start (or resume) the counting again if the number of pulses of the encoder signal input when the rotation occurs in the preset direction is greater than the number of pulses of the encoder signal input when the rotation occurs in the opposite direction to the preset direction. This method may be a counting method that may compensate for a phenomenon in which the motor 120 rotates in the opposite direction due to inertia caused by the torque of the motor 120 when the movement (transport) of the inspection target 10 is temporarily stopped in the vision inspection apparatus 100.

In addition, the encoder signal processing unit 141 may further include a reference signal setting unit 141*c* that sets a reference encoder signal according to the driving direction of the motor 120. The reference signal setting unit 141*c* may set the reference encoder signal according to the driving direction of the motor 120, and may set the reference encoder signal in advance so that the directionality of the encoder signal transmitted from the encoder unit 130 (or the driving direction of the motor from the encoder signal transmitted from the encoder) may be determined (or separated) based on the reference encoder signal. For example, by dividing the rotation direction of the motor 120 into forward direction (e.g., clockwise) and reverse direction (e.g., counterclockwise), two code tracks using two channels having a phase difference of approximately 90 degrees may be set. That is, the code track in which the encoder signal of the channel A has a phase approximately 90 degrees ahead of the encoder signal of the channel B may be set as forward rotation of the motor 120, and conversely, the code track in which the encoder signal of the channel B has a phase approximately 90 degrees ahead of the encoder signal of the channel A may be set as reverse rotation of the motor 120.

In this case, the encoder signal analysis unit 141*a* may determine the driving direction of the motor 120 by comparing the reference encoder signal and the encoder signal, and may determine the driving direction of the motor 120 depending on which setting signal (e.g., code track) among the reference encoder signals the encoder signal transmitted from the encoder unit 130 is identical to. For example, the encoder signal analysis unit 141*a* may determine the driving direction (or rotation direction) of the motor 120 by checking the direction of the phase difference between the two channels (or the channel A and the channel B) having phase difference of approximately 90 degrees (or which of the two channels is ahead). That is, if the encoder signal of the channel A is ahead of the encoder signal of the channel B by approximately 90 degrees, the encoder signal analysis unit 141*a* may determine that the motor 120 is driven in the forward direction, and if the encoder signal of the channel B is ahead of the encoder signal of the channel A by approximately 90 degrees, the encoder signal analysis unit 141*a* may determine that the motor 120 is driven in the reverse direction. Here, the forward driving direction of the motor 120 may be a driving direction (e.g., a rotational direction) of the motor 120 that moves the inspection target 10 in a (preset) forward direction (e.g., forwardly), and may be a clockwise rotation of the motor 120. In addition, the reverse driving direction of the motor 120 may be a driving direction of the motor 120 that moves the inspection target 10 in a (preset) reverse direction (e.g., rearwardly), and may be a counterclockwise rotation of the motor 120.

In addition, the encoder count unit 141*b* may increase the encoder count value when the encoder signal analysis unit 141*a* determines that the motor 120 is driven in the forward direction, and may decrease the encoder count value when the encoder signal analysis unit 141*a* determines that the motor 120 is driven in the reverse direction. That is, the encoder count value may represent a movement distance of the inspection target 10, and in the forward driving of the motor 120, the inspection target 10 is moved in the forward direction and the (forward) movement distance of the inspection target 10 increases, and thus the encoder count value may be increased, and in the reverse drive of the motor 120, the inspection target 10 is moved in the reverse direction and the (forward) movement distance of the inspection target 10 decreases (or the (reverse) movement distance of the inspection target increases), and thus the encoder count value may be decreased. In this case, the positive (+) encoder count value may be the forward movement distance of the inspection target 10, and the negative (−) encoder count value may be the reverse movement distance of the inspection target 10.

Here, the encoder data 41 may include the encoder count value, and the encoder count value indicates a driving distance (e.g., rotational speed) of the motor 120, so that the movement distance of the inspection target 10 according to the driving of the motor 120 may be known. Therefore, the movement distance of the inspection target 10 may be calculated using the encoder count value included in the encoder data 41, and the location of the inspection target 10 may be found according to the calculated movement distance of the inspection target 10.

In addition, the vision inspection device 100 according to the present disclosure may further include an image data generation unit 115 that generates the image data 15 using an image signal generated according to the image capturing of the imaging device 110.

The image data generation unit 115 may generate the image data 15 using an image signal generated according to the image capturing of the imaging device 110, and may generate the image data 15 by converting the image signal transmitted from the imaging device 110. For example, an image signal may be analogized for easy transmission, and the image data 15 may be generated by digitizing the image signal so that the image signal can be read by a computer, etc. Meanwhile, when there are a plurality of imaging devices 110, there may also be a plurality of image data generation units 115, and the image data generation unit 115 may include a first image data generation unit 115*a* that generates first image data 15*a* and a second image data generation unit 115*b* that generates second image data 15*b*.

Figure 3:
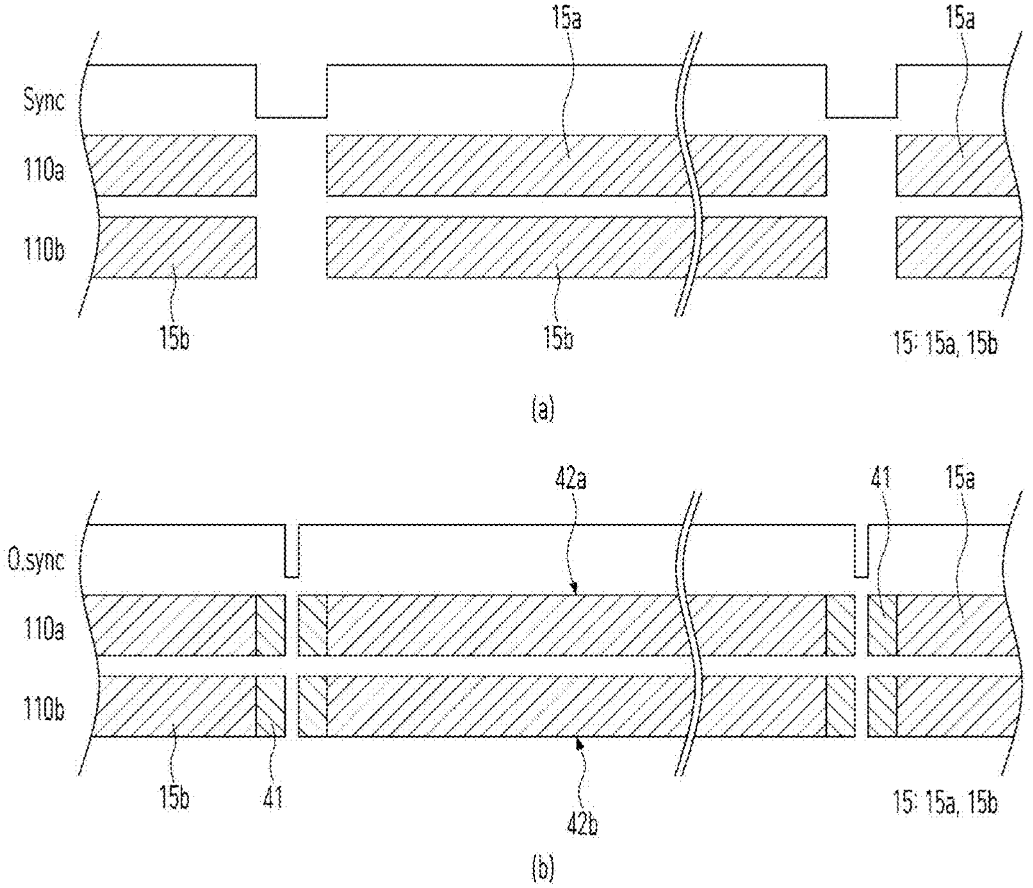
FIG. 3 is a conceptual diagram for describing a synchronization signal and an output synchronization signal according to an embodiment of the present disclosure.

FIG. 3 is a conceptual diagram for describing a synchronization signal and an output synchronization signal according to an embodiment of the present disclosure. (a) of FIG. 3 shows a synchronization signal included in an image signal, and (b) of FIG. 3 shows an output synchronization signal that changes according to fused image data.

Referring to FIG. 3, the image signal may include a synchronization signal Sync, and the image signal may be converted according to the synchronization signal to generate the image data 15. The synchronization signal Sync may be a signal mixed into the image signal to synchronize (or match) the image capturing (or scan) timing of the imaging device 110 and the scanning or playback (display) of the image output device 150 so that the image signal can be accurately output (or displayed) from the image output device 150 as it is captured by the imaging device 110. For example, the synchronization signal may distinguish the capturing time (interval) and the rest (or pause) period (interval) of the imaging device 110, and the image section and the non-image section may be distinguished according to the synchronization signal in the image signal.

Meanwhile, the vision inspection apparatus 100 of the present disclosure may further include a synchronization signal generation unit (not shown) that generates the synchronization signal.

The synchronization signal generation unit (not shown) may generate the synchronization signal, and may be included in the imaging device 110, or may be provided outside the imaging device 110 and transmit the generated synchronization signal to the imaging device 110 in order to mix (or include) the generated synchronization signal into the image signal. Here, the synchronization signal is a signal transmitted together with the image signal, and may include a horizontal synchronization signal Hsync and a vertical synchronization signal Vsync, and the image data 15 may be acquired from the image signal according to the synchronization signal generated by the synchronization signal generation unit (not shown). For example, when the vertical synchronization signal Vsync starts, the quantity of electric charge accumulated in the pixels of the image sensor may start to be acquired, and pixels of each horizontal line of the image sensor may be sequentially scanned one horizontal line at a time for each horizontal synchronization signal Hsync. In this case, a plurality of horizontal synchronization signals Hsync may be entered into one vertical synchronization signal Vsync, and a first horizontal synchronization signal Hsync may start together with the vertical synchronization signal (Vsync).

The image data generation unit 115 may generate a plurality of image data 15 according to the synchronization signal, and the image fusion unit 142 may respectively merge each encoder data 41 to a front end or rear end of each image data 15. For example, the imaging device 110 may be a linear imaging device, and may generate image data 15 according to the horizontal synchronization signal Hsync, and may generate the plurality of image data 15 one for each horizontal synchronization signal Hsync. Here, the plurality of image data 15 generated according to the horizontal synchronization signals Hsync within one vertical synchronization signal Vsync may form one screen (image plane) output from an image output unit 150.

In this case, the image data 15 is generated according to the synchronization signal, and the image data 15 may only include the image section, and in order to avoid losing (or not losing) the image data 15, the image fusion unit 142 may respectively merge each encoder data 41 to the front end or rear end of each image data 15 as shown in (b) of FIG. 3. Accordingly, the entire image section of the image data 15 may be used (as it is) without loss, and thereby output an image as it is without loss.

In addition, the vision inspection device 100 according to the present disclosure may further include an output image signal generation unit 144 that generates an output image signal using the fused image data 42.

The output image signal generation unit 144 may generate an output image signal using the fused image data 42, and the generated output image signal may be output from the image output unit 150 such as a monitor.

Here, the output image signal may include an output synchronizing signal O.sync as in (b) of FIG. 3, and the output synchronizing signal O.sync may control the scanning of the image output unit 150. For example, the image output unit 150 may scan an (image) signal in which the output synchronizing signal is 1 (on), and when the output synchronizing signal is 0 (off), the (image) signal may not be scanned, and when the output synchronizing signal changes from 1 (on) to 0 (off) and then back to 1 (on), the scanning line may change.

In this case, as in FIG. 3, the synchronizing signal Sync and the output synchronizing signal O.sync may be different from each other. For example, in the output synchronization signal, the encoder data 41 may be merged at the front end or rear end of the image data 15 and thus the signal that is 1 (on) may be longer than the synchronization signal and the signal that is 0 (off) may be shorter than the synchronization signal. In the case where if the signal that is 1 (on) in the output synchronization signal becomes longer than that in the synchronization signal, not only the image captured by the imaging device 110, but also the encoder data 41 such as the encoder count value or (location) coordinates may be displayed on the image output unit 150. Accordingly, the visibility of the defect location of the inspection target 10 can be improved.

In addition, the vision inspection device 100 according to the present disclosure may further include a lighting unit 160 capable of changing lighting brightness according to the synchronization signal.

The lighting unit 160 is capable of changing the lighting brightness according to the synchronization signal, and may change the lighting brightness by using the number and/or intensity (or strength) of lights, and the brightness of lighting may also be changed depending on which light among a plurality of lighting having different intensity is turned on. For example, the lighting unit 160 may include at least one lighting and a lighting control unit for controlling the lighting, and the lighting control unit may control the lighting according to a trigger signal transmitted from the trigger generation unit 145.

The synchronization signal may include a pulse signal, and the lighting unit 160 may change the lighting brightness in a second pulse differently from the lighting brightness in a first pulse. The synchronization signal may include the pulse signal and distinguish between on and off signals, and the off (0) signal of the pulse signals may indicate a rest (or pause) time, and the on (1) signal of the pulse signals may indicate an image capturing time. In this case, the lighting may be turned on at the on (1) signal, and the lighting may be turned off at the off (0) signal.

In addition, the lighting unit 160 may change the lighting brightness at the second pulse (i.e., the second on signal) differently from the lighting brightness at the first pulse (i.e., the first on signal). Here, the lighting brightness at the second pulse may be made relatively brighter than the lighting brightness at the first pulse, and the lighting brightness at the second pulse may be made relatively darker than the lighting brightness at the first pulse. Meanwhile, the lighting unit 160 may make the lighting brightness different for each pulse.

For example, the lighting brightness at an (n+1)-th pulse may be made different from the lighting brightness at an n-th pulse, and the lighting brightness at the even-numbered pulse (i.e., the even-numbered on signal) may be made relatively brighter or darker than the lighting brightness at the odd-numbered pulse (i.e., the odd-numbered on signal).

Here, the image fusion unit 142 may further fuse the brightness value data according to the lighting brightness to generate the fused image data 42, and brightness value data may be further fused to the fused image data 42 and the fused image data 42 may be output to the image output unit 150 according to the brightness value data. For example, the vision inspection apparatus 100 of the present disclosure may further include a brightness value sensor 165 that measures the lighting brightness. The brightness value sensor 165 may detect (or sense) light emitted from the lighting to measure the lighting brightness, and may generate the brightness value data with the brightness value of the lighting (or the lighting brightness value) measured in this way. By further fusing the brightness value data to the fused image data 42, it is possible to know whether the fused image data 42 is the fused image data 42 having bright lighting brightness or the fused image data 42 having dark lighting brightness.

In this case, the fused image data 42 may be grouped according to the brightness value (e.g., luminance, brightness, illuminance, etc.) of the brightness value data, the fused image data 42 having the same brightness value of the brightness value data may be grouped together, the fused image data 42 having (relatively) large brightness value (i.e., the fused image data having bright lighting brightness) may be grouped together, and the fused image data 42 having (relatively) small brightness value (i.e., the fused image data having dark lighting brightness) may be grouped together.

The defects of the inspection target 10 may include a defect that is easily visible in a bright place, a defect that is easily visible in a dark place, or a combination of the defect that is easily visible in the bright place and the defect that is easily visible in the dark place. Conventionally, the vision inspection was performed by moving the inspection target 10 twice or more while changing the lighting or by capturing the image of the stationary inspection target 10 twice or more in order to clearly check both the defect that is easily visible in the bright place and the defect that is easily visible in the dark place. However, in the present disclosure, by grouping the fused image data 42 having the same brightness value data together, even if the inspection target 10 is moved only once without stopping, an image having bright lighting brightness and an image having dark lighting brightness may be obtained. Accordingly, not only may the visibility of the defect of the inspection target 10 be further improved, but also the time of the vision inspection, the number of times the inspection target 10 is moved, and/or the number of times the image of the same location is captured may be reduced.

For example, after capturing the image of the inspection target 10 by making the lighting brightness bright (or dark) in the odd-numbered pulses and, on the contrary, making the lighting brightness dark (or bright) in the even-numbered pulses, only the fused image data 42 having the bright lighting brightness may be used to output an image having the bright lighting brightness to the image output unit 150, and only the fused image data 42 having the dark lighting brightness may be used to output an image having the dark lighting brightness to the image output unit 150. In this case, the image having the bright lighting brightness from which the (horizontal) line having dark lighting brightness is removed may be output to the image output unit 150, and the image having the dark lighting brightness from which the (horizontal) line having bright lighting brightness is removed may be output to the image output unit 150. Here, an image obtained by connecting (horizontal) lines above and below a location of the removed (horizontal) line by completely removing the location of the removed (horizontal) line may be output to the image output unit 150, or an image obtained by inserting a median value of values of the (horizontal) lines above and below the removed (horizontal) line may be output to the image output unit 150. Through this, an image having bright lighting brightness and an image having dark lighting brightness may be obtained for (almost) the same area with just one (continuous) movement of the inspection target 10.

In addition, the imaging device 110 may be provided in plurality, to respectively captures at least partially the inspection target, and the imaging device 110 may be composed of a plurality of imaging devices and the plurality of imaging devices 110 may respectively (image) capture (the image of) the inspection target 10 at least partially. For example, the plurality of imaging devices 110 may be provided (or arranged) at different locations, and may respectively capture the image of the inspection target 10 at different locations and/or angles (or at different locations and/or angles) and may capture the image of the inspection target 10 as a whole (or the entire inspection target) or may capture the image of the inspection target 10 (or a part of the inspection target) partially. Here, the plurality of imaging devices 110 may respectively capture images of the inspection target 10 at the same point in time (or time), and may capture the image of the inspection target 10 periodically (or continuously), or may capture the image of the inspection target 10 simultaneously according to a trigger signal.

Each of the imaging devices 110*a* and 110*b* may respectively capture an image of at least partially different part, and the image fusion unit 142 may respectively fuse each encoder data 41 to each of image data 15*a* and 15*b* acquired by each of the imaging devices 110*a* and 110*b* to generate a plurality of fused image data 42*a*, 42*b*, and 42*c*. Each of the imaging devices 110*a* and 110*b* may capture each of images of at least partially different parts, and the image data 15*a* and 15*b* respectively acquired by the imaging devices 110*a* and 110*b* may be combined (or merged) to generate an image of a larger size (or area), and a wider area (or range) of the inspection target 10 may be inspected.

In addition, the image fusion unit 142 may generate the plurality of fused image data 42*a*, 42*b*, and 42*c* by fusing each encoder data 41 to each of the image data 15*a* and 15*b* respectively acquired by the imaging devices 110*a* and 110*b*, and may synchronize the plurality of fused image data 42*a*, 42*b*, and 42*c* through the encoder data 41, and may merge (or combine) the synchronized plurality of fused image data 42*a*, 42*b*, and 42*c* to generate a larger image at the same time point. Here, when each of the plurality of imaging devices 110 captures an image of the inspection target 10 at the same time, the same (one) encoder data 41 may be (respectively) fused to each of image data 15*a* and 15*b* respectively acquired by the imaging devices 110*a* and 110*b*.

In this case, each of the fused image data 42*a*, 42*b*, and 42*c*, of which the encoder count values are the same may be synchronized with each other, and the fused image data 42*a*, 42*b*, and 42*c* having the same encoder count value in (or among) the fused image data 42*a*, 42*b*, and 42*c* may be synchronized with each other. The encoder count value indicates the driving distance of the motor 120 and is calculated based on the driving of the motor 120, and thus the same encoder count value indicates the same point in time (or time). Accordingly, each of fused image data 42*a*, 42*b*, and 42*c* having the same encoder count value may be each of fused image data 42*a*, 42*b*, and 42*c* obtained by capturing the image of the inspection target 10 at the same time, and a large image at the same point in time may be generated by synchronizing the fused image data 42*a*, 42*b*, and 42*c* having the same (or equal) encoder count value with each other.

Therefore, in the vision inspection device 100 according to the present disclosure, the fused image data 42*a*, 42*b*, and 42*c* having the same encoder data 41 (i.e., the encoder count value) can be synchronized with each other when generating (or capturing an image of) each of at least partially different images (or locations) using each of a plurality of imaging devices 110*a* and 110*b*. Accordingly, synchronization between image data 15*a* and 15*b* each generated (or acquired) by each of the plurality of imaging devices 110*a* and 110*b* can be facilitated, and a larger image obtained by capturing the inspection target 10 at the same point in time may also be generated by combining the synchronized fused image data 42*a*, 42*b*, and 42*c*. Through this, it is possible to detect defects in the inspection target 10 more accurately, and to effectively find the defect location of the inspection target 10 by finding the defects in the inspection target 10.

Meanwhile, the image fusion unit 142 may replace or combine a part of the image data 15 with the encoder data 41. The image fusion unit 142 may replace a part of the image data 15 with the encoder data 41, and may fuse the encoder data 41 to the image data 15 by replacing unnecessary data or background data among the image data 15 with the encoder data 41. For example, the image fusion unit 142 may replace some pixel values (or image values) of the image data 15 with the encoder count value of the encoder data 41, and may replace the image values (or pixel values) of the unnecessary data or background data with the encoder count value. In this case, the unnecessary data or background data may be data at a location other than the inspection location or data from a peripheral location outside the inspection target 10, and may be (pixel) data (value) corresponding to (or located at) a corner (or edge) in an image generated from the image data 15. In the case where the imaging device 110 is a linear imaging device, the encoder data 41 may be fused to (or replaced with) a start point and/or an end point of each scan line among the image data 15, and in the case where the imaging device 110 is an area imaging device, the encoder data 41 may be selectively fused to (or replaced with) the start point and/or the end point of the image section and the start point (and/or the end point) of the non-image section among the image data 15. That is, when the imaging device 110 is the area imaging device, the encoder data 41 may be fused only to the start point and/or the end point of the image section, the encoder data 41 may be fused only to the start point (and/or the end point) of the non-image section, and the encoder data 41 may be fused to both the start point and/or the end point of the image section and the start point (and/or the end point) of the non-image section. In this case, the encoder data 41 may be fused only to a part of one frame of the start point and/or the end point of the image section, and the encoder data 41 may be fused to one frame (entirely) of the start point (and/or the end point) of the non-image section.

In addition, the image fusion unit 142 may combine a part of the image data 15 with the encoder data 41, and may add or subtract the encoder data 41 to and from a part (location) of the image data 15. For example, the image fusion unit 142 may add or subtract the encoder count value of the encoder data 41 to and from an image value (or pixel value) of a part (location) of the image data 15, and may remove (or subtract or add) the encoder count value (again) and use the image data 15 in its entirety (as it is) after the location of the inspection target 10 displayed (or indicated) by the image generated (or output) from the image data 15 is found.

Accordingly, the vision inspection device 100 of the present disclosure may combine (e.g., adds or subtracts) the encoder data 41 with a part (location) of the image data 15 while generating the fused image data 42 and thereby use a part of the image data 15*a* and 15*b* where the encoder data 41 is located (or stored) without being lost (or discarded) by removing the encoder data 41 from the fused image data 42 after the image data(s) 15*a* and 15*b* respectively generated by the a plurality of imaging devices 110*a* and 110*b* are synchronized with each other.

As an example, in the secondary battery production line, a close-packed image sensor (CIS) is widely used, and although the shape thereof is a single image capture device (or camera), an image is output by block (e.g., approximately 300 mm), and the image processing unit 143 such as a frame grabber corresponding to the block and the image output unit 150 such as a monitor corresponding to the block may also be configured by each block. In this vision inspection device 100, since an image between blocks corresponds to a vision inspection area, the original image should not be damaged, and thus the encoder count value inserted between blocks may be processed by adding or subtracting it to and from an image value (or pixel value), and the image value inserted into a first block and/or a last block may be relatively compared with the entire value combined (or replaced) with the image value to accurately find the location thereof.

In this case, the encoder signal processing unit 141 and the image fusion unit 142 and/or the image data generation unit 115 may form a control unit 140, and the control unit 140 may further include an image processing unit 143, and the image output unit 150 may output (or display) the image processed by the image processing unit 143. Here, the image processing unit 143 may acquire (or receive) the fused image data 42, analyze and process the fused image data 42, and may receive the fused image data 42 as the output image signal through the output image signal generation unit 144. In this case, the image processing unit 143 may acquire an image quality value through the analysis of the fused image data 42, and may correct the image by comparing the image quality value with a reference image quality value. For example, the image processing unit 143 may convert an analog signal of the output image signal into digital data that may be processed by a personal computer (PC) by digitizing the analog signal into bits defined per sample, and the image output unit 150 may output an image as the converted digital data. In this case, the image processing unit 143 may transmit the image to a plurality of image output units 150 or a computer, and may transmit an image to each image output unit 150 or the computer in different formats.

In addition, the motor 120 may move the inspection target 10 in a first direction, and the imaging device 110 may scan in a second direction intersecting with the first direction. The motor 120 may be a first motor, and may (continuously) move the inspection target 10 in the first direction, and the encoder unit 130 may detect the driving of the motor 120.

In addition, the imaging device 110 may perform scanning in the second direction intersecting with the first direction, may continuously scan the inspection target 10 while changing a scan location (in the first direction) according to the movement of the inspection target 10 in the first direction by the motor 120, and may also output an image (or video) of a larger area than a scan area once to the image output unit 150. Accordingly, a wide area of the inspection target 10 may be captured with a single imaging device 110, and the entire inspection target 10 may be scanned (or captured) simply by (continuously) moving the inspection target 10 in the first direction. For example, scanning (line) in the second direction may be scanned in a horizontal direction (or a horizontal line) on a screen of the image output unit 150, and (next) scanning (line) may be scanned by moving the scanning line in a vertical direction on the screen of the image output unit 150 as the scanning (line) moves in the first direction. Through this, an image of a size (or area) corresponding to the screen of the image output unit 150 may be output to the image output unit 150, and a wide area of the inspection target 10 may be subjected to vision inspection.

In addition, the vision inspection device 100 according to the present disclosure may further include an auxiliary motor (not shown) that moves the imaging device 110 in the second direction. The auxiliary motor (not shown) may be a second motor and may discontinuously and/or continuously move the imaging device 110 in the second direction, and the imaging device 110 may scan the inspection target 10 in the second direction. For example, the auxiliary motor (not shown) may occasionally (or discontinuously) move the imaging device 110 in the second direction only when necessary to adjust only the location of the imaging device 110 in the second direction, and may continuously move the imaging device 110 in the second direction to scan a longer length (or area) in the second direction.

In this case, the encoder unit 130 may further detect the driving of the auxiliary motor (not shown), and the image fusion unit 142 may fuse the encoder data 41 of the motor 120 and the encoder data 41 of the auxiliary motor (not shown) to the image data 15 to generate the fused image data 42. That is, since the fused image data 42 includes the encoder data 41 of the motor 120 and the encoder data 41 of the auxiliary motor (not shown), the location (information) in the first direction through the encoder data 41 of the motor 120 and the location (information) in the second direction through the encoder data 41 of the auxiliary motor (not shown) may be used to more accurately find the (defect) location of the inspection target 10, and (location) coordinates (x, y) that can be found (or searched) by automatic equipment such as robots may be provided.

Meanwhile, the synchronization signal Sync and/or the output synchronization signal O.sync may be used to synchronize images captured (or photographed) by the plurality of imaging devices 110*a* and 110*b* when combining the images with each other, and the images may be synchronized with each other when combining the images through the synchronization signal and/or the output synchronization signal.

In addition, the vision inspection device 100 according to the present disclosure may further include a temperature sensor (not shown) that measures the temperature of the lighting unit 160.

The temperature sensor (not shown) may measure the temperature of the lighting unit 160, measure the temperature of the lighting of the lighting unit 160, and determine whether the lighting may be continuously used and whether the lighting is broken (or damaged) through the measured temperature value of the lighting. The vision inspection device 100 uses very bright lighting (e.g., lighting of approximately 1 million Lux or more) to easily detect defects in the inspection target 10, and as a result, heat is generated from a light source of the lighting, and due to this heat, the brightness value of the lighting decreases and its lifespan is also shortened as time passes.

In this case, the image fusion unit 142 may further fuse the temperature value data measured by the temperature sensor (not shown) to generate the fused image data 42. That is, the image fusion unit 142 may further fuse the temperature value data (e.g., temperature value data of the lighting) measured by the temperature sensor (not shown) to the fused image data 42, and may also predict the lifespan of the lighting and establish a repair schedule for the lighting through the temperature value data and the brightness value data. For example, a change in the brightness value of the lighting may be analyzed from the brightness value data of the fused image data 42, and the effect of the heat of the lighting on the change in brightness value of the lighting can be known through the temperature value data of the lighting, and through this, the lifespan of the lighting may be predicted and a repair schedule for the lighting may be established.

Meanwhile, the vision inspection device 100 of the present disclosure may further include a sensor (not shown) that detects a specific shape or a specific location of the inspection target 10 and a sensor signal input unit (not shown) that receives a sensor detection signal from the sensor (not shown).

The sensor (not shown) may detect a specific shape or a specific location of the inspection target 10, and generate a sensor detection signal to transmit it to the sensor signal input unit (not shown).

The sensor signal input unit (not shown) may receive the sensor detection signal from the sensor (not shown), and may directly receive the sensor detection signal generated by detecting a specific shape or a specific location by the sensor (not shown). For example, the sensor signal input unit (not shown) may be implemented in the form of a terminal or connector to which a wire transmitting the sensor detection signal of the sensor (not shown) may be connected.

Here, the sensor detection signal may be used to set a frame of an image by the image data 15 and/or the fused image data 42, and the frame may start or end at the specific shape or specific location.

In this case, the image fusion unit 142 may further fuse the detection data obtained by the sensor detection signal to the image data 15, and the sensor detection signal may be converted into the detection data and fused to the image data 15 together with the encoder data 41, and transmitted to the image processing unit 143, etc.

Figure 4:
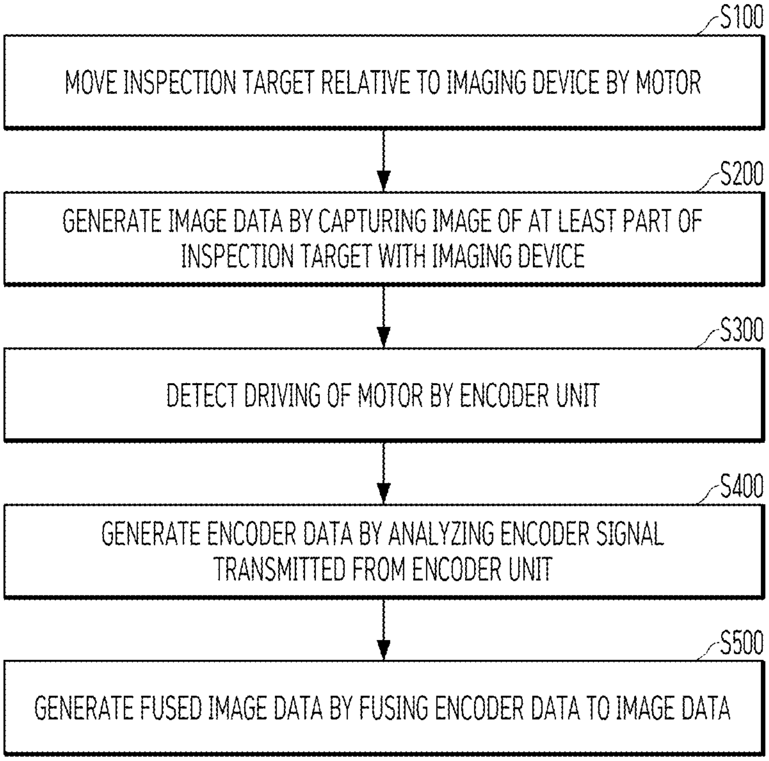
FIG. 4 is a flowchart showing a vision inspection method according to another embodiment of the present disclosure.

FIG. 4 is a flowchart showing a vision inspection method according to another embodiment of the present disclosure.

Referring to FIG. 4, a vision inspection method according to another embodiment of the present disclosure will be described in more detail. Details that overlap with those previously described in relation to the vision inspection device according to an embodiment of the present disclosure will be omitted.

A vision inspection method according to another embodiment of the present disclosure a process of moving the inspection target 10 relative to the imaging device 110 by the motor 120 (S100), a process of generating image data 15 by capturing an image of at least a part of the inspection target 10 that relatively moves by the motor 120 using the imaging device 110 (S200), a process of detecting driving of the motor 120 by the encoder unit 130 (S300), a process of generating the encoder data 41 by analyzing an encoder signal transmitted from the encoder unit 130 (S400), and a process of generating the fused image data 42 by fusing the encoder data 41 of a time when the imaging device 110 captured the image to the image data 15.

First, the inspection target 10 is moved relative to the imaging device 110 through the motor 120 (S100). The inspection target 10 may be moved relative to the imaging device 110 through the motor 120 and the relative locations of the imaging device 110 and the inspection target 10 may be adjusted. Through this, the imaging device 110 may capture images of different locations of the inspection target 10 and/or different inspection targets 10 (over time). In this case, the motor 120 may move the inspection target 10, may move the imaging device 110, or may move both the inspection target 10 and the imaging device 110.

Next, an image of at least a part of the inspection target 10 relatively moving by the motor 120 is captured by the imaging device 110 to generate the image data 15 (S200). The image of at least a part of an inspection target 10 that is a subject of a vision inspection (or optical inspection) can be captured by the imaging device 110 to generate the image data 15, and the imaging device 110 may include an image sensor, etc., and may generate an electrical image signal (or Video Signal) by measuring the amount of light per pixel incident on the image sensor. For example, the image sensor may generate the image signal through the amount of electric charge accumulated in each pixel (or pixel) of the image sensor by converting light, and may transmit the generated image signal to the image data generation unit 115, and the image data generation unit 115 may generate the image data 15 from the transmitted image signal. In this case, there may be one imaging device 110 or a plurality of imaging devices 110 may be provided.

Next, the driving of the motor 120 is detected by the encoder unit 130 (S300). The encoder unit 130 may detect the driving (e.g., rotation) of the motor 120, and may output (or generate) an encoder signal according to the driving of the motor 120. For example, the encoder unit 130 may be provided on a rotation shaft of the motor 120, may detect the rotation of the motor 120, and may generate the encoder signal indicating (or for recognizing) a location of the inspection target 10 (i.e., a location on the stage). In this case, the encoder signal may be in the form of a pulse train, and the encoder unit 130 may be provided on the motor 120 that rotates the roll on which the inspection target 10 is wound when the inspection target 10 is wound on a roll, In addition, the encoder signal transmitted from the encoder unit 130 is analyzed to generate encoder data 41 (S400). The encoder signal processing unit 141 may analyze the encoder signal transmitted from the encoder unit 130 to generate encoder data 41, separate a directionality of the encoder signal, and count the encoder signal according to the directionality of the encoder signal. For example, the encoder signal processing unit 141 may be provided with a terminal or connector to which a wire that is connected to the encoder unit 130 and transmits the encoder signal may be connected, and the encoder signal may be input (or transmitted) thereto through the terminal or connector. Here, the encoder signal processing unit 141 may identify (or know) the location of the inspection target 10 through the encoder signal, and may generate the encoder data 41 with which the location of the inspection target 10 may be checked (or found).

Next, the encoder data 41 of a time when the imaging device 110 captured the image is fused to the image data 15 to generate fused image data 42 (S500). The image fusion unit 142 may generate fused image data 42 by fusing (or converging) the encoder data 41 during image capturing by the image capturing device 110 to the image data 15 acquired by the imaging device 110, and may insert and/or merge the encoder data 41 into a specific location (or a part) of the image data 15, and may also change (or replace) a specific location of the image data 15 with the encoder data 41. Accordingly, the location of the inspection target 10 may be checked (or identified) through the encoder data 41 inherent (or included) in the fused image data 42, and the defect location of the inspection target 10 may be effectively found when a defect is found (or detected) in the image output (or generated) as the fused image data 42.

The process of generating the image data 15 (S200) may include a process of generating a plurality of the image data according to a synchronization signal included in an image signal by using the image signal generated according to image capturing of the imaging device 110 (S250), and the process of generating the fused image data 42 (S500) may include a process of merging each of the encoder data 41 to a front end or rear end of each of the image data, respectively (S550).

The plurality of image data 15 may be generated according to the synchronization signal included in the image signal using the image signal generated according to image capturing of the imaging device 110 (S250). The imaging device 110 may be a linear imaging device, and may generate the image data 15 according to the horizontal synchronization signal Hsync by using the image signal generated according to the image capturing of the imaging device 110, and may generate the plurality of image data 15 one for each horizontal synchronization signal Hsync. Here, the plurality of image data 15 generated according to the horizontal synchronization signal Hsync within one vertical synchronization signal Vsync may form one screen (image plane) output from the image output unit 150.

In addition, each encoder data 41 may be respectively merged to a front end or rear end of each image data 15 (S550). The image data 15 is generated according to the synchronization signal, and the image data 15 may only include the image section, and in order to avoid losing (or not losing) the image data 15, the image fusion unit 142 may merge each encoder data 41 to the front end or rear end of each image data 15. Accordingly, the entire image section of the image data 15 can be used (as it is) without loss, thereby outputting an image as it is without loss.

The synchronization signal may include a pulse signal and distinguish between on and off, and the off (0) signal of the pulse signal may indicate a rest (or pause) time, and the on (1) signal of the pulse signal may indicate an image capturing time. In this case, the lighting may be turned on at the on (1) signal, and the lighting may be turned off at the off (0) signal.

Here, the process of generating the plurality of the image data 15 (S250) may include a process of capturing an image of at least a part of the inspection target with a first lighting brightness in a first pulse (S251) and a process of capturing at least a part of the inspection target 10 with a second lighting brightness different from the first lighting brightness in a second pulse (S252).

An image of at least a part of the inspection target 10 may be captured with the first lighting brightness in the first pulse (S251). In the first pulse, the image of at least a part of the inspection target 10 may be captured with the first lighting brightness, and may be captured brightly or darkly.

In addition, in the second pulse, the image of at least a part of the inspection target 10 may be captured with the second lighting brightness that is different from the first lighting brightness (S252). In the second pulse, the image of at least a part of the inspection target 10 may be captured with a second lighting brightness different from the first lighting brightness, and as the inspection target 10 (relatively) moves, an image capturing location of the inspection target 10 of which image is captured in the first pulse and an image capturing location of the inspection target 10 of which image is captured in the second pulse may be at least partially different from each other. For example, if the image is captured brightly in the first pulse, the image may be captured darkly in the second pulse, and if the image is captured darkly in the first pulse, the image may be captured brightly in the second pulse.

In this case, in the process of generating the fused image data 42 (S500), brightness value data according to the lighting brightness may be further fused to generate the fused image data 42. The image fusion unit 142 may further fuse the brightness value data according to the lighting brightness to generate the fused image data 42, and brightness value data may be further fused to the fused image data 42 and the fused image data 42 may be output to the image output unit 150 according to the brightness value data. For example, the vision inspection apparatus 100 of the present disclosure may further include a brightness value sensor 165 that measures the lighting brightness, and the brightness value sensor 165 may detect (or sense) light emitted from the lighting to measure the lighting brightness, and may generate the brightness value data with the brightness value of the lighting (or the lighting brightness value) measured in this way. By further fusing the brightness value data to the fused image data 42, it is possible to know whether the fused image data 42 is fused image data 42 having bright lighting brightness or fused image data 42 having dark lighting brightness.

The vision inspection method according to the present disclosure may further include a process (S610) of grouping fused image data 42 according to the brightness value of the brightness value data.

The fused image data 42 may be grouped according to the brightness value of the brightness value data (S610). The fused image data 42 may be grouped according to the brightness value (e.g., luminance, brightness, illuminance, etc.) of the brightness value data, the fused image data 42 having the same brightness value of the brightness value data may be grouped together, the fused image data 42 having (relatively) large brightness value (i.e., the fused image data having bright lighting brightness) may be grouped together, and the fused image data 42 having (relatively) small brightness value (i.e., the fused image data having dark lighting brightness) may be grouped together.

The defects of the inspection target 10 may include a defect that is easily visible in a bright place, a defect that is easily visible in a dark place, or a combination of the defect that is easily visible in the bright place and the defect that is easily visible in the dark place. Conventionally, the vision inspection was performed by moving the inspection target 10 twice or more while changing the lighting or by capturing the image of the stationary inspection target 10 twice or more in order to clearly check both the defect that is easily visible in the bright place and the defect that is easily visible in the dark place. However, in the present disclosure, by grouping the fused image data 42 having the same brightness value data together, even if the inspection target 10 is moved only once without stopping, an image having bright lighting brightness and an image having dark lighting brightness may be obtained. Accordingly, not only may the visibility of the defect of the inspection target 10 be further improved, but also the time of the vision inspection, the number of times the inspection target 10 is moved, and/or the number of times the image of the same location is captured may be reduced.

For example, after capturing the image of the inspection target 10 by making the lighting brightness bright (or dark) in the odd-numbered pulses and, on the contrary, making the lighting brightness dark (or bright) in the even-numbered pulses, only the fused image data 42 having the bright lighting brightness may be used to output an image having the bright lighting brightness to the image output unit 150, and only the fused image data 42 having the dark lighting brightness may be used to output an image having the dark lighting brightness to the image output unit 150. In this case, the image having the bright lighting brightness from which the (horizontal) line having dark lighting brightness is removed may be output to the image output unit 150, and the image having the dark lighting brightness from which the (horizontal) line having bright lighting brightness is removed may be output to the image output unit 150. Here, an image obtained by connecting (horizontal) lines above and below a location of the removed (horizontal) line by completely removing the location of the removed (horizontal) line may be output to the image output unit 150, or an image obtained by inserting a median value of values of the (horizontal) lines above and below the removed (horizontal) line may be output to the image output unit 150. Through this, an image having bright lighting brightness and an image having dark lighting brightness may be obtained for (almost) the same area with just one (continuous) movement of the inspection target 10.

Meanwhile, the process of generating the encoder data 41 (S400) may include a process of analyzing the driving direction of the motor 120 based on the encoder signal (S410) and a process of calculating the encoder count value by counting the encoder signal according to the driving direction of the motor 120 (S420).

The driving direction of the motor 120 may be analyzed based on the encoder signal (S410). The encoder signal analysis unit 141*a* may analyze the driving direction (e.g., the rotation direction) of the motor 120 based on the encoder signal, and may analyze the driving direction of the motor 120 by analyzing the encoder signal transmitted (or input) from the encoder unit 130, and the analyzed driving direction of the motor 120 may be used to calculate the encoder count value by the encoder count unit 141*b*. For example, the encoder signal analysis unit 141*a* may analyze the rotation direction of the motor 120 based on two channels of encoder signals transmitted from the encoder unit 130. Generally, the encoder signal may be generated in the form of a two-channel pulse train generated using two code tracks having a phase difference of approximately 90 degrees. In this case, if a rotation axis of the motor 120 rotates clockwise (CW), an encoder signal of channel A may be set to have a phase that is approximately 90 degrees ahead of an encoder signal of channel B, and conversely, if the rotation axis of the motor 120 rotates counterclockwise (CCW), an encoder signal of channel B may be set to have a phase that is approximately 90 degrees ahead of the encoder signal of channel A. Here, the encoder signal analysis unit 141*a* may analyze the rotation direction of the motor 120 by checking a phase difference between the encoder signals of the two channels having such a phase difference.

In addition, the encoder count value may be calculated by counting the encoder signal according to the driving direction of the motor 120 (S420). The encoder count unit 141*b* may count the encoder signal according to the driving direction of the motor 120 to calculate the encoder count value, may count the encoder signal based on the driving direction of the motor 120 analyzed by the encoder signal analysis unit 141*a*, and the encoder count value may be obtained (or determined) according to the count of the encoder signal. For example, the encoder count unit 141*b* may count the encoder signal when the rotation of the motor 120 is either clockwise (CW) or counterclockwise (CCW) according to a preset (counting method). That is, the encoder count unit 141*b* may count the encoder signal only when it is analyzed that rotation occurs in a preset direction (e.g., clockwise), and may not count the encoder signal when it is analyzed that rotation occurs in a direction opposite to the preset direction (e.g., counterclockwise).

The vision inspection method according to the present disclosure may further include a process of setting a reference encoder signal according to the driving direction of the motor 120 (S40).

The reference encoder signal may be set according to the driving direction of the motor 120 (S40). The reference signal setting unit 141*c* may set the reference encoder signal according to the driving direction of the motor 120, and may set the reference encoder signal in advance so that the directionality of the encoder signal transmitted from the encoder unit 130 (or the driving direction of the motor from the encoder signal transmitted from the encoder) may be determined (or separated) based on the reference encoder signal. For example, by dividing the rotation direction of the motor 120 into forward direction (e.g., clockwise) and reverse direction (e.g., counterclockwise), two code tracks using two channels having a phase difference of approximately 90 degrees may be set. That is, the code track in which the encoder signal of the channel A has a phase that is approximately 90 degrees ahead of the encoder signal of the channel B may be set as forward rotation of the motor 120, and conversely, the code track in which the encoder signal of the channel B has a phase that is approximately 90 degrees ahead of the encoder signal of the channel A may be set as reverse rotation of the motor 120.

In this case, the process of analyzing the driving direction of the motor 120 (S410) may include a process of comparing the reference encoder signal and the encoder signal to determine the driving direction of the motor 120 (S411).

The driving direction of the motor 120 may be determined by comparing the reference encoder signal and the encoder signal (S411). The encoder signal analysis unit 141*a* may determine the driving direction of the motor 120 by comparing the reference encoder signal and the encoder signal, and may determine the driving direction of the motor 120 depending on which setting signal (e.g., code track) among the reference encoder signals the encoder signal transmitted from the encoder unit 130 is identical to. For example, the encoder signal analysis unit 141*a* may determine the driving direction (or rotation direction) of the motor 120 by checking the direction of the phase difference between the two channels (or the channel A and the channel B) having a phase difference of approximately 90 degrees (or which of the two channels is ahead), and may determine that the motor 120 is driven in the forward direction when the encoder signal of the channel A is ahead of the encoder signal of the channel B by approximately 90 degrees, and may determine that the motor 120 is driven in the reverse direction when the encoder signal of the channel B is ahead of the encoder signal of the channel A by approximately 90 degrees. Here, the forward driving of the motor 120 may be a driving direction (e.g., a rotational direction) of the motor 120 that moves the inspection target 10 in a (preset) forward direction (e.g., forwardly) and may be a clockwise rotation of the motor 120. The reverse driving of the motor 120 may be a driving direction of the motor 120 that moves the inspection target 10 in a (preset) reverse direction (e.g., rearwardly), and may be a counterclockwise rotation of the motor 120.

The process of calculating the encoder count value (S420) may include a process of increasing the encoder count value when it is determined that the motor 120 is driven in the forward direction (S421) and a process of decreasing the encoder count value when it is determined that the motor 120 is driven in the reverse direction (S422).

When it is determined that the motor 120 is driving in the forward direction, the encoder count value may be increased (S421). That is, the encoder count value may indicate a movement distance of the inspection target 10, and in the forward driving of the motor 120, the inspection target 10 is moved in the forward direction and the (forward) movement distance of the inspection target 10 increases, and thus the encoder count value may be increased, and the forward movement distance of the inspection target 10 may be expressed by the positive (+) encoder count value.

In addition, when it is determined that the motor 120 is driving in the reverse direction, the encoder count value may be decreased (S422). In the reverse driving of the motor 120, the inspection target 10 is moved in the reverse direction and the (forward) movement distance of the inspection target 10 decreases (or the (reverse) movement distance of the inspection target increases), and thus the encoder count value may be decreased. The reverse movement distance of the inspection target 10 may be expressed by the negative (−) encoder count value.

The encoder data 41 may include the encoder count value, and the imaging device 110 may include first and second imaging devices 110*a* and 110*b*. The encoder data 41 may include the encoder count value, and the encoder count value indicates a driving distance (e.g., the number od rotations) of the motor 120, so that the movement distance of the inspection target 10 according to the driving of the motor 120 may be known. Therefore, the movement distance of the inspection target 10 may be calculated using the encoder count value included in the encoder data 41, and the location of the inspection target 10 may be found according to the calculated movement distance of the inspection target 10.

The imaging device 110 may be composed of a plurality of imaging devices and may include first and second imaging devices 110*a* and 110*b*, and the first and second imaging devices 110*a* and 110*b* may each capture the image of the inspection target 10 at least partially. For example, the first and second imaging devices 110*a* and 110*b* may be provided (or arranged) at different locations, and may respectively capture the image of the inspection target 10 at different locations and/or angles (or at different locations and/or angles) and may capture the image of the inspection target 10 as a whole (or the entire inspection target) or may capture the image of the inspection target 10 (or a part of the inspection target) partially. Here, the first and second imaging devices 110*a* and 110*b* may capture images of the inspection target 10 at the same point in time (or time), and may capture the image of the inspection target 10 periodically (or continuously), or may capture the image of the inspection target 10 simultaneously according to a trigger signal.

In this case, the process of generating the image data 15 (S200) may include a process of generating the first image data 15*a* by capturing an image of at least a part of the inspection target 10 with the first imaging device 110*a* (S210) and a process of generating the second image data 15*b* by capturing an image of at least a part of the inspection target 10 that is at least partially different from the first imaging device 110*a* with the second imaging device 110*b* (S220).

The image of at least a part of the inspection target 10 may be captured using the first imaging device 110*a* to generate the first image data 15*a* (S210). The first image data 15*a* may be generated by the image data generation unit 115 by capturing the image of at least a part of the inspection target 10 with the first imaging device 110*a*, and the first image data 15*a* may be at least partially different from the second image data 15*b* of which image is captured by the second imaging device 110*b*, and may be different in at least one of the image capturing location, direction, and angle. That is, the image generated from the first image data 15*a* may have the same portion that overlaps with the image generated from the second image data 15*b*, but may also have at least some portions that are different.

In addition, the second imaging device 110*b* may capture an image of at least a part of the inspection target 10 that is at least partially different from the first imaging device 110*a* to generate the second image data 15*b* (S220). The second imaging device 110*b* may capture an image of at least a part of the inspection target 10 that is at least partially different from the first imaging device 110*a* to generate the second image data 15*b* by the image data generation unit 115, and the second image data 15*b* may be at least partially different from the first image data 15*a* captured by the first imaging device 110*a*, and may be different in at least one of the imaging location, direction, and angle. That is, the image generated from the second image data 15*b* may have the same overlapping portion as the image generated from the first image data 15*a*, but at least some portions may be different from the image generated from the first image data 15*a*. Meanwhile, the first image data 15*a* and the second image data 15*b* may be generated by the first image data generation unit 115*a* and the second image data generation unit 115*b*, respectively.

In addition, the process of generating the fused image data 42 (S500) may include a process of generating the first fused image data 42*a* by fusing the encoder data 41 to the first image data 15*a* (S510) and a process of generating the second fused image data 42*b* by fusing the encoder data 41 to the second image data 15*b* (S520).

The first fused image data 42*a* may be generated by fusing the encoder data 41 to first image data 15*a* (S510). The image fusion unit 142 may fuse the encoder data 41 to the first image data 15*a* to generate the first fused image data 42*a*. The encoder data 41 may be used to find the location of the inspection target 10, but may also be used to synchronize the first image data 15*a* with the second image data 15*b*.

In addition, the second fused image data 42*b* may be generated by fusing the encoder data 41 to the second image data 15*b* (S520). The image fusion unit 142 may generate the second fused image data 42*b* by fusing the same encoder data 41 as the first image data 15*a* to the second image data 15*b*, and the first fused image data 42*a* and the second fused image data 42*b* may have the same encoder data 41. Meanwhile, when the number of the imaging device 110 is three or more and a third imaging device is included therein, third image data may be generated by the third imaging device, and third fused image data 42*c* may be generated by fusing the encoder data 41 to the third image data.

Here, the vision inspection method according to the present disclosure may further include a process of synchronizing the first fused image data 42*a* and the second fused image data 42*b* having the same encoder count value (S550).

The first fused image data 42*a* and the second fused image data 42*b* having the same encoder count value may be synchronized with each other (S550). The image processing unit 143 may synchronize the first fused image data 42*a* and the second fused image data 42*b* having the same encoder count value with each other through the encoder data 41, and may merge (or combine) the synchronized first fused image data 42*a* and the second fused image data 42*b* to generate an image of a larger size (or area) at the same point in time, thereby allowing a wider area (or range) of the inspection target 10 to be inspected.

The process of generating the fused image data 42 (S500) may include a process of replacing with or combining a part of the image data 15 with the encoder data 41 (S515).

A part of the image data 15 may be replaced or combined with the encoder data 41 (S515). The image fusion unit 142 may replace a part of the image data 15 with the encoder data 41, and may fuse the encoder data 41 to the image data 15 by replacing unnecessary data or background data among the image data 15 with the encoder data 41. For example, the image fusion unit 142 may replace some pixel values (or image values) of the image data 15 with the encoder count value of the encoder data 41, and may replace the image values (or pixel values) of the unnecessary data or background data with the encoder count value. Here, the unnecessary data or background data may be data at a location other than the inspection location or data from a peripheral location outside the inspection target 10, and may be (pixel) data (value) corresponding to (or located at) a corner (or edge) in an image generated from the image data 15. In the case where the imaging device 110 is a linear imaging device, the encoder data 41 may be fused to (or replaced with) the start point and/or the end point of each scan line among the image data 15, and in the case where the imaging device 110 is an area imaging device, the encoder data 41 may be selectively fused to (or replaced with) the start point and/or the end point of the image section and the start point (and/or the end point) of the non-image section among the image data 15. That is, when the imaging device 110 is the area imaging device, the encoder data 41 may be fused only to the start point and/or the end point of the image section, the encoder data 41 may be fused only to the start point (and/or the end point) of the non-image section, and the encoder data 41 may be fused to both the start point and/or the end point of the image section and the start point (and/or the end point) of the non-image section. In this case, the encoder data 41 may be fused only to a part of one frame of the start point and/or the end point of the image section, and the encoder data 41 may be fused to one frame (entirely) to the start point (and/or the end point) of the non-image section.

In addition, the image fusion unit 142 may combine a part of the image data 15 with the encoder data 41, and may add or subtract the encoder data 41 to and from a part (location) of the image data 15. For example, the image fusion unit 142 may add or subtract the encoder count value of the encoder data 41 to and from an image value (or pixel value) of a part (location) of the image data 15, and may remove (or subtract or add) the encoder count value (again) and use the image data 15 in its entirety (as it is) after the location of the inspection target 10 displayed (or indicated) by the image generated (or output) from the image data 15 is found.

The process relatively moving the inspection target 10 (S100) may include a process of moving the inspection target 10 in the first direction using the motor 120 (S110).

The inspection target 10 may be moved in a first direction by the motor 120 (S110). The motor 120 may move the inspection target 10 in the first direction, and the encoder unit 130 may detect the driving of the motor 120.

In addition, the vision inspection device 100 may further include an auxiliary motor (not shown) that moves the imaging device 110, and the process of relatively moving the inspection target 10 (S100) may further include a process of moving the imaging device 110 in a second direction intersecting with the first direction (S120).

The auxiliary motor (not shown) may move the imaging device 110 in the second direction intersecting with the first direction.

Here, the imaging device 110 may be moved in the second direction intersecting with the first direction (S120). The imaging device 110 may be moved in the second direction intersecting with the first direction by the auxiliary motor (not shown) and the imaging device 110 may scan the inspection target 10 in the second direction, and the encoder unit 130 may also detect the driving of the auxiliary motor (not shown). For example, the auxiliary motor (not shown) may occasionally (or discontinuously) move the imaging device 110 in the second direction only when necessary to adjust only the location of the imaging device 110 in the second direction, and may continuously move the imaging device 110 in the second direction to scan a longer length (or area) in the second direction.

In this case, the process of generating the fused image data 42 (S500) may include a process of fusing the encoder data 41 of the motor 120 and the encoder data 41 of the auxiliary motor (not shown) to the image data 15 (S505).

The encoder data 41 of the motor 120 and the encoder data 41 of the auxiliary motor (not shown) may be fused to the image data 15 (S505). The image fusion unit 142 may generate the fused image data 42 by fusing the encoder data 41 of the motor 120 and the encoder data 41 of the auxiliary motor (not shown) to the image data 15, and the location (information) in the first direction through the encoder data 41 of the motor 120 and the location (information) in the second direction through the encoder data 41 of the auxiliary motor (not shown) may be used to more accurately find the (defect) location of the inspection target 10, and (location) coordinates (x, y) that automatic equipment such as robots can find (or find) may be provided.

In this way, in the preset disclosure, an inspection target moving relative to an imaging device by a motor can be captured (or photographed) using the imaging device to generate image data, and encoder data during image capturing can be fused to the generated image data, thereby effectively detecting a defect location of the inspection target according to the encoder data included in the fused image data. That is, the image capturing location of the image capturing inspection for the inspection target can be determined according to the driving of the motor, and the driving of the motor can be detected by the encoder unit to know the location of the inspection target captured by the imaging device. In addition, by fusing the encoder data according to the driving of the motor during image capturing to the image data through the capturing of the imaging device while capturing the image of the inspection target with the imaging device, the defect location of the inspection target can be accurately found according to the encoder data of the fused image data in which a defect is found. In addition, when generating (or capturing images of) at least partially different images using a plurality of imaging devices, fused image data having the same encoder data can be synchronized with each other. Accordingly, synchronization between image data generated by a plurality of imaging devices can be facilitated, and fused image data synchronized with other can be combined to generate an image which has a larger size and is obtained by capturing an image of the inspection target at the same point in time. Through this, defects in the inspection target can be detected more accurately, and defects in the inspection target can be found to effectively find the defect location of the inspection target. By merging (or combining) encoder data to the front end or rear end of the image data while generating the fused image data, all of the image data can be used without losing any image data while outputting the image from the fused image data. Although preferred embodiments of the present inventive concept have been shown and described above, the present inventive concept is not limited to the embodiments described above, and those skilled in the art will understand that various modifications and other equivalent embodiments are possible from the embodiments without departing from the gist of the present inventive concept as claimed in the claims. Therefore, the scope of technical protection of the present inventive concept should be determined by the claims below.

The vision inspection apparatus according to the embodiment of the present disclosure can capture (or photograph) an inspection target moving relative to an imaging device by a motor using the imaging device to generate image data, and fuse encoder data during image capturing to the generated image data, thereby effectively detecting a defect location of the inspection target according to the encoder data included in the fused image data. That is, the image capturing location of the image capturing inspection for the inspection target can be determined according to the driving (e.g., the rotation) of the motor, and the driving of the motor can be detected by the encoder unit to know the location of the inspection target captured by the imaging device. In addition, by fusing the encoder data according to the driving of the motor during image capturing to the image data through the image capturing of the imaging device while capturing the image of the inspection target with the imaging device, the defect location of the inspection target can be accurately found according to the encoder data of the fused image data in which a defect is found (or detected).

In addition, when generating (or capturing images of) at least partially different images (or locations) using a plurality of imaging devices, fused image data having the same encoder data can be synchronized with each other. Accordingly, synchronization between image data generated by the plurality of imaging devices can be facilitated, and fused image data synchronized with each other can be combined to generate an image which has a larger size (or area) and is obtained by capturing an image of the inspection target at the same point in time.

Through this, defects in the inspection target can be detected more accurately, and defects in the inspection target can be found to effectively find the defect location of the inspection target.

In addition, in the vision inspection method of the present disclosure, by merging (or combining encoder data at the front end or rear end of the image data while generating the fused image data, all of the image data can be used without losing (or discarding) any image data (part of the image data) while outputting the image from the fused image data.

Although the vision inspection apparatus and the vision inspection method have been described with reference to the specific embodiments, they are not limited thereto. Therefore, it will be readily understood by those skilled in the art that various modifications and changes can be made thereto without departing from the spirit and scope of the present inventive concept defined by the appended claims.

DESCRIPTION OF REFERENCE NUMERALS

| | |
|---|---|
| 10: inspection target | 15: image data |
| 15a: first image data | 15b: second image data |

-continued

| | |
|---|---|
| 41: encoder data | 42: fused image data |
| 42a: first fused image data | 42b: second fused image data |
| 42c: third fused image data | 100: vision inspection apparatus |
| 110: imaging device | 110a: first imaging device |
| 110b: second imaging device | 115: image data generation unit |
| 115a: first image data generation unit | 115b: second image data generation unit |
| 120: motor | 125: stage |
| 130: encoder unit | 140: control unit |
| 141: encoder signal processing unit | 141a: encoder signal analysis unit |
| 141b: encoder count unit | 141c: reference signal setting unit |
| 142: image fusion unit | 143: image processing unit |
| 144: output image signal generation unit | 145: trigger generation unit |
| 150: image output unit | 160: lighting unit |
| 165: brightness value sensor | |

What is claimed is:

1. A vision inspection apparatus, comprising:

an imaging device configured to capture at least a part of an inspection target;

a motor configured to move at least one of the imaging device and the inspection target so that a relative location of the imaging device and the inspection target change;

an encoder unit configured to detect driving of the motor;

an encoder signal processing unit configured to analyze an encoder signal transmitted from the encoder unit to generate encoder data; and an image fusion unit configured to fuse the encoder data to image data acquired by the imaging device to generate fused image data.

2. The vision inspection apparatus of claim 1, wherein the imaging device is configured to capture an image of the inspection target moving relative to the imaging device, and the image fusion unit is configured to fuse the encoder data of a time when the imaging device captured the image to the image data.

3. The vision inspection apparatus of claim 1, further comprising:

an image data generation unit configured to generate the image data using an image signal generated according to image capturing of the imaging device, wherein the image signal comprises a synchronization signal.

4. The vision inspection apparatus of claim 3, wherein the image data generation unit is configured to generate a plurality of the image data according to the synchronization signal, and the image fusion unit is configured to respectively merge each of the encoder data to a front end or rear end of each of the image data.

5. The vision inspection apparatus of claim 4, further comprising:

an output image signal generation unit configured to generate an output image signal using the fused image data, wherein the output image signal comprises an output synchronization signal.

6. The vision inspection apparatus of claim 5, wherein the synchronization signal and the output synchronization signal are different from each other.

7. The vision inspection apparatus of claim 3, further comprising:

a lighting unit configured to change lighting brightness according to the synchronization signal.

8. The vision inspection apparatus of claim 7, wherein the synchronization signal comprises a pulse signal, and the lighting unit changes the lighting brightness in a second pulse differently from the lighting brightness in a first pulse.

9. The vision inspection apparatus of claim 8, wherein the image fusion unit further fuses brightness value data according to the lighting brightness to generate the fused image data.

10. The vision inspection apparatus of claim 9, wherein the fused image data is grouped according to a brightness value of the brightness value data.

11. The vision inspection apparatus of claim 1, wherein the encoder signal processing unit comprises:

an encoder signal analysis unit configured to analyze a driving direction of the motor based on the encoder signal; and an encoder count unit configured to count the encoder signal according to the driving direction of the motor to calculate an encoder count value.

12. The vision inspection apparatus of claim 11, wherein the encoder data comprises the encoder count value, and the imaging device is provided in plurality, to respectively capture at least partially the inspection target.

13. The vision inspection apparatus of claim 12, wherein each of the imaging devices is configured to respectively capture an image of at least partially different part, and the image fusion unit is configured to respectively fuse each of the encoder data to each of the image data acquired by each of the imaging devices to generate a plurality of the fused image data.

14. The vision inspection apparatus of claim 13, wherein each of the fused image data, of which the encoder count values are the same is synchronized with each other.

15. The vision inspection apparatus of claim 1, wherein the motor moves the inspection target in a first direction, and the imaging device perform scanning in a second direction intersecting with the first direction.

16. The vision inspection apparatus of claim 15, further comprising:

an auxiliary motor that moves the imaging device in the second direction, wherein the encoder unit is configured to further detect driving of the auxiliary motor, and the image fusion unit is configured to fuse encoder data of the motor and encoder data of the auxiliary motor to the image data to generate the fused image data.

17. The vision inspection apparatus of claim 7, further comprising:

a temperature sensor configured to measure a temperature of the lighting unit, wherein the image fusion unit is configured to further fuse temperature value data measured by the temperature sensor to generate the fused image data.

18. A vision inspection method comprising:

moving an inspection target relative to an imaging device by a motor;

generating image data by capturing an image of at least a part of the inspection target that relatively moves by the motor using the imaging device;

detecting driving of the motor by an encoder unit;

generating encoder data by analyzing an encoder signal transmitted from the encoder unit; and generating fused image data by fusing the encoder data of a time when the imaging device captured the image to the image data.

19. The vision inspection method of claim 18, wherein the generating the image data comprises generating a plurality of the image data according to a synchronization signal comprised in an image signal by using the image signal generated according to image capturing of the imaging device, and the generating the fused image data comprises merging each of the encoder data to a front end or rear end of each of the image data, respectively.

20. The vision inspection method of claim 19, wherein the synchronization signal comprises a pulse signal, and the generating the plurality of the image data further comprises:

capturing an image of at least a part of the inspection target with a first lighting brightness in a first pulse; and capturing an image of at least a part of the inspection target with a second lighting brightness different from the first lighting brightness in a second pulse, and in the generating the fused image data, brightness value data according to lighting brightness is further fused to generate the fused image data.

* * * * *